(12) United States Patent
Yang et al.

(10) Patent No.: US 10,187,820 B2
(45) Date of Patent: *Jan. 22, 2019

(54) SYSTEM AND METHOD FOR REDUCING SIGNALING OVERHEAD

(71) Applicant: Futurewei Technologies, Inc., Plano, TX (US)

(72) Inventors: Yunsong Yang, San Diego, CA (US); Young Hoon Kwon, San Diego, CA (US); Zhigang Rong, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/920,167

(22) Filed: Oct. 22, 2015

(65) Prior Publication Data

US 2016/0044535 A1 Feb. 11, 2016

Related U.S. Application Data

(63) Continuation of application No. 13/894,144, filed on May 14, 2013, now Pat. No. 9,204,287.

(60) Provisional application No. 61/668,366, filed on Jul. 5, 2012, provisional application No. 61/647,343, filed on May 15, 2012.

(51) Int. Cl.
  *H04L 1/00* (2006.01)
  *H04W 28/06* (2009.01)
  *H04W 8/22* (2009.01)
  *H04W 48/08* (2009.01)

(52) U.S. Cl.
  CPC ............. *H04W 28/06* (2013.01); *H04W 8/22* (2013.01); *H04W 48/08* (2013.01)

(58) Field of Classification Search
  CPC ... H04L 1/167; H04L 1/1685; H04L 25/0224; H04L 25/0226; H04L 25/022
  USPC .......................................... 370/252, 232, 235
  See application file for complete search history.

(56) References Cited

U.S. PATENT DOCUMENTS

| 8,830,846 B2 | 9/2014 | Grandhi et al. |
| 2006/0248429 A1 | 11/2006 | Grandhi et al. |
| 2007/0072638 A1* | 3/2007 | Yang ..................... H04W 52/50 455/522 |

(Continued)

FOREIGN PATENT DOCUMENTS

| CN | 1941717 A | 4/2007 |
| CN | 101262274 A | 9/2008 |
| CN | 101361323 A | 2/2009 |

(Continued)

OTHER PUBLICATIONS

Kwon, et al., "AP Discovery Information Broadcasting," IEEE 802.11-12/0568r1, May 2012, 12 pages.

(Continued)

*Primary Examiner* — Dady Chery
(74) *Attorney, Agent, or Firm* — Slater Matsil, LLP

(57) ABSTRACT

A method for operating a first station includes receiving a first management frame from a communications device, and generating an optimized management frame including a reference to the first management frame and update information for the first management frame specific to the first station. The method also includes transmitting the optimized management frame.

12 Claims, 14 Drawing Sheets

(56) References Cited

U.S. PATENT DOCUMENTS

2007/0243888 A1    10/2007   Faccin
2010/0135226 A1     6/2010   Chandramouli et al.

FOREIGN PATENT DOCUMENTS

| | | |
|---|---|---|
| JP | H05191454 A | 7/1993 |
| JP | H1188464 A | 3/1999 |
| JP | 2000069531 A | 3/2000 |
| JP | 2003289306 A | 10/2003 |
| JP | 2007013649 A | 1/2007 |
| JP | 2009520433 A | 5/2009 |
| JP | 2009525666 A | 7/2009 |
| JP | 2011049844 | 3/2011 |
| JP | 2011229161 A | 11/2011 |
| JP | 2011259159 A | 12/2011 |
| KR | 20080092445 A | 10/2008 |
| WO | 2007080495 A2 | 7/2007 |

OTHER PUBLICATIONS

Extended European Search Report received in Application No. 13790408.2-1854 dated Mar. 26, 2015, 9 pages.

International Search Report and Written Opinion of Patent Cooperation Treaty (PCT), International Application No. PCT/CN2013/075651, Applicant Huawei Technologies Co., Ltd., dated Aug. 22, 2013, 10 pages.

Korean Office Action received in Application No. 10-2014-7034977 dated Aug. 7, 2015, 6 pages.

Kwon, et al., "AP Discovery Informatino Broadcasting," IEEE 802.11-12/0568r2, May 2012, 12 pages.

IEEE 802.11-2012, Part 11: Wireless LAN Medium Access Control(MAC) and Physical Layer(PHY) Specifications, IEEE Computer Society, Mar. 29, 2012, total 2793 pages.

\* cited by examiner

SYSTEM AND METHOD FOR REDUCING SIGNALING OVERHEAD

This application is a continuation of U.S. patent application Ser. No. 13/894,144, filed on May 14, 2013, entitled "System and Method for Reducing Signaling Overhead," which claims the benefit of U.S. Provisional Application No. 61/647,343, filed on May 15, 2012, entitled "System and Method for Reducing Signaling Overhead of Active Scanning," and U.S. Provisional Application No. 61/668,366, filed on Jul. 5, 2012, entitled "System and Method for Reducing Signaling Overhead for Network Access," all of which applications are hereby incorporated herein by reference.

TECHNICAL FIELD

The present disclosure relates generally to digital communications, and more particularly to a system and method for reducing signaling overhead.

BACKGROUND

Institute of Electrical and Electronics Engineers (IEEE) 802.11 is a set of standards for implementing wireless local area network (WLAN) or Wi-Fi communication. A Task Group has been assigned to develop a standard for IEEE 802.11ai Fast Initial Link Set-up (FILS), which is referred to as IEEE 802.11 Task Group ai (TGai). IEEE 802.11ai FILS is intended to substantially reduce the time for a Wi-Fi station (STA) or handset (also commonly referred to as a mobile, a mobile station, a user, a terminal, a subscriber, and the like) to connect with a Wi-Fi access point (AP) (also commonly referred to as a base station, NodeB, enhanced NodeB, base terminal station, communications controller, and the like) by providing a media access control (MAC) layer protocol for fast authentication and association of a Wi-Fi handheld with a Wi-Fi access point.

In IEEE 802.11 Task Group ai (TGai), a need for Fast Initial Link Set-up (FILS) generally comes from an environment where mobile users are constantly entering and leaving the coverage area of an existing extended service set (ESS). Every time a station enters an ESS, the station performs an initial link set-up to establish WLAN connectivity. This generally requires efficient mechanisms that scale with a high number of users simultaneously entering the ESS, minimize the time spent within the initial link set-up phase, and securely provide initial authentication. The work scope of TGai may include improvements for access point/network discovery, secure authentication, and a mechanism to support concurrency in the exchange of higher layer protocol messages during the authentication phase.

SUMMARY OF THE DISCLOSURE

Example embodiments of the present disclosure which provide a system and method for reducing signaling overhead.

In accordance with an example embodiment of the present disclosure, a method for operating a station includes station receiving a first frame from an access point, the first frame including information about the access point and an associated reference number, transmitting a second frame including the reference number, and receiving a third frame from the access point, wherein the third frame is optimized to include only a portion of the information about the access point.

In accordance with another example embodiment of the present disclosure, a method for operating an access point includes transmitting a first frame including information about the access point and an associated reference number, receiving a second frame including the reference number from a station, and transmitting a third frame optimized to include only a portion of the information about the access point.

One advantage of an embodiment is that the use of optimized management frames, such as probe requests and/or probe responses, leverages previously transmitted or received management frames to reduce communications system overhead and improve overall communications system performance.

A further advantage of an embodiment is that the reduction in communications system overhead tends to increase as number of users increase. Therefore, the effectiveness of the example embodiments increases as the need increases.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to reducing signaling overhead. For example, at a first station, the first station receives a first management frame from a communications device, generates an optimized management frame including a reference to the first management frame and update information for the first management frame specific to the first station, and transmits the optimized management frame. As another example, at a first access point, the first access point receives a first management frame from a first station, generates a first optimized management frame responsive to the first management frame, the first optimized management frame including a reference to a second management frame transmitted by a communications device and update information for the second management frame specific to the first station, and transmits the first optimized management frame.

The present disclosure will be described with respect to example embodiments in a specific context, namely an IEEE 802.11 TGai compliant communications system that uses active scanning and passive scanning for access point/network discovery. The disclosure may also be applied, however, to other standards compliant, such as The Third Generation Partnership Project (3GPP) or Machine to Machine (e.g. oneM2M) technical standards, and non-standards communications systems that use scanning for access point/network discovery.

Figure 1:
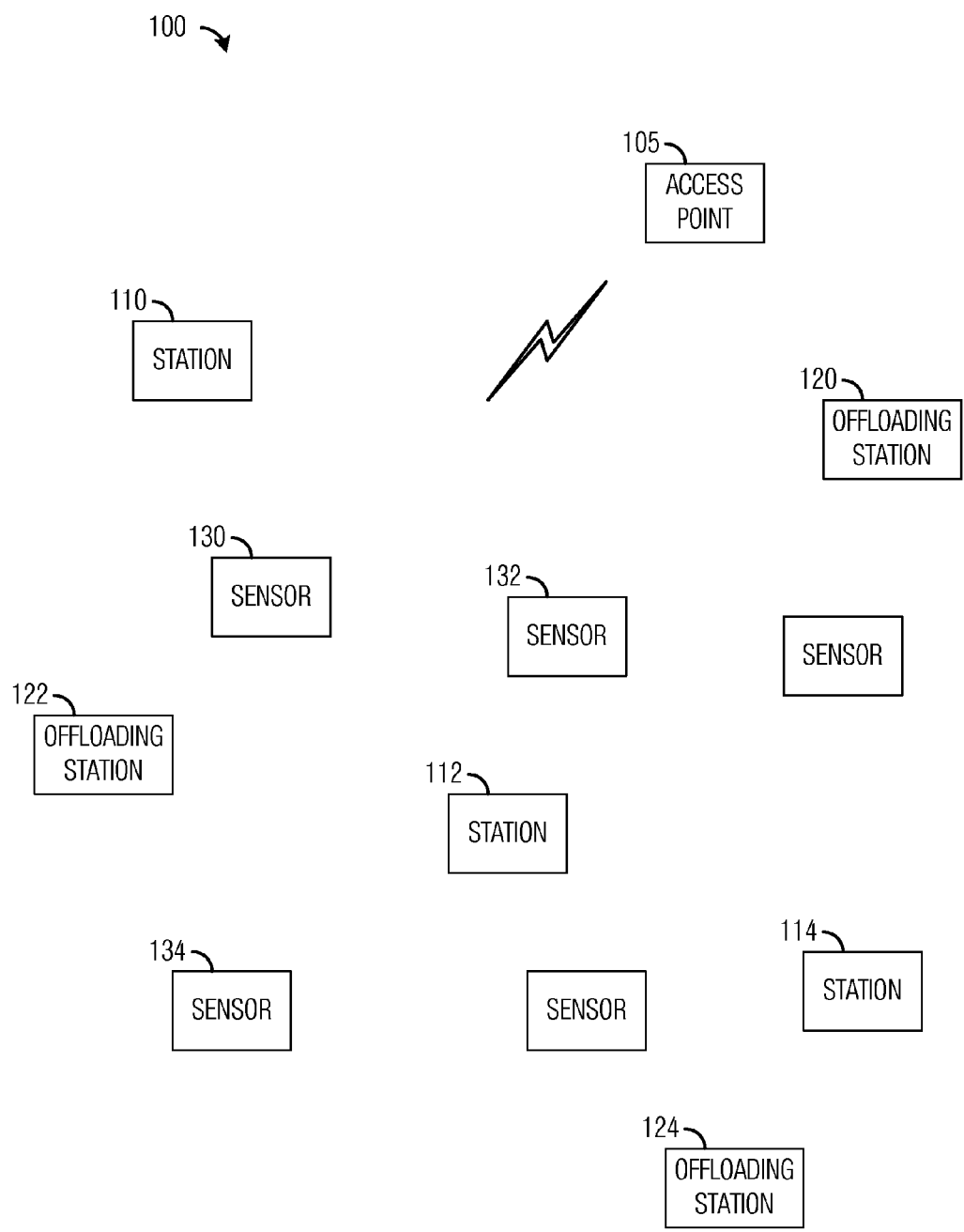
FIG. 1 illustrates an example communications system according to example embodiments described herein.

FIG. 1 illustrates a communications system 100. It is noted that communications system 100 may also be referred to as a wireless LAN (WLAN) basic service set (BSS). Communications system 100 includes an access point (AP) 105 serving a plurality of stations. It is noted that access point and the plurality of stations are examples of communications devices. The plurality of stations may include typical stations, such as stations 110 through 114, and may include personal computers, laptops, tablets, multi-media servers, and the like. The plurality of stations may also include offloading stations, such as offloading stations 120 through 124, and may include stations that typically access services through other access networks. Examples offloading stations include cellular telephones, user equipment, and the like. The plurality of stations may also include sensors, such as sensors 130 through 134. In general, sensors are used to gather information, such as weather information, security information, position information, health information, safety information, performance information, and the like. The sensors may transmit the information through access point 105 to a server or an information aggregator. The sensors may also aggregate the information prior to transmitting the information.

While it is understood that communications systems may employ multiple access points capable of communicating with a number of stations, only a limited number of access points and stations are illustrated for simplicity.

In the IEEE 802.11 technical standards, there are two scanning techniques defined for access point/network discovery. A first technique is referred to as passive scanning. In passive scanning, a station listens to beacon frames transmitted by access points for a specified period of time. Then, according to the beacon frames, the station discovers the access points and selects one of the access points to initiate an association with. Passive scanning does not add any additional transmissions and therefore does not negatively impact communications system overhead. A second technique is referred to as active scanning. In active scanning, a station transmits a probe request frame that includes a service set identifier (SSID) of one or more access points that the station wishes to discover. One or more access points listed in the probe request frame may send a probe response frame to the station. The probe response frame may include information about the access point as well as information about the communications system. The station may select an access point to associate with in accordance with the information contained in the probe response frames. Active scanning allows for fast access point/network discovery since the station may transmit the probe request frame as soon as it is able to obtain access to the communications channel. However, active scanning adds to communications system overhead and may negatively impact communications system efficiency.

Figure 2:
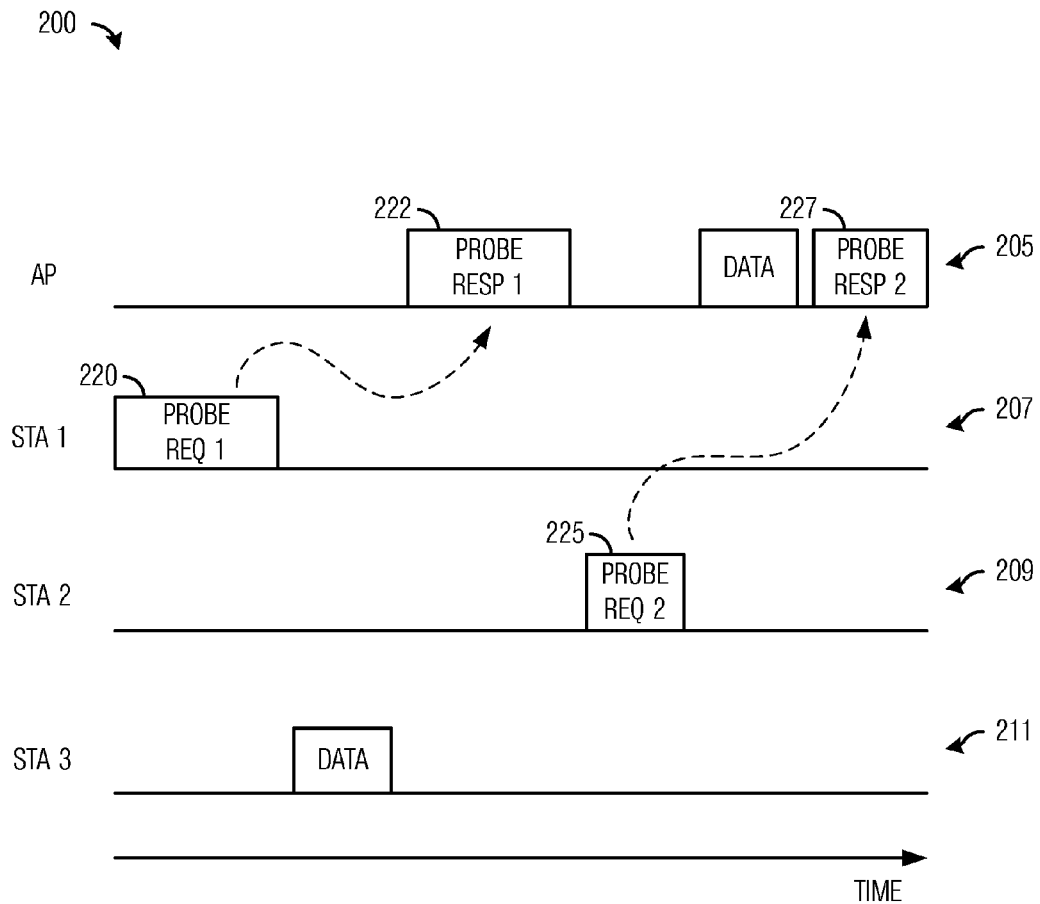
FIG. 2 illustrates an example diagram of transmissions made in a communications system according to example embodiments described herein.

FIG. 2 illustrates a diagram 200 of transmissions made in a communications system. As shown in FIG. 2, a first trace 205 represents transmissions made by an access point ("AP"), a second trace 207 represents transmissions made by a first station ("STA 1"), a third trace 209 represents transmissions made by a second station ("STA 2"), and a fourth trace 211 represents transmissions made by a third station ("STA 3").

The first station may transmit a first probe request ("PROBE REQ 1") 220 to the access point and the access point may respond by transmitting a first probe response ("PROBE RESP 1") 222. Similarly, the second station may transmit a second probe request ("PROBE REQ 2") 225 to the access point and the access point may respond by transmitting a second probe response ("PROBE RESP 2") 227.

It is noted that probe requests and probe responses are examples of management frames transmitted by stations and access points. Generally, management frames are used to establish and/or maintain communications. Examples of management frames include: probe request frames, probe response frames, association request frames, association response frames, authentication request frames, authentication response frames, deauthentication frames, reassociation request frames, reassociation response frames, disassociation frames, beacon frames, public action frames (e.g., generic advertisement service (GAS) initial request frames, GAS initial response frames, GAS comeback request frames, and GAS comeback response frames), and the like. Therefore, the discussion of probe request frames and probe response frames should not be construed as being limiting to the scope or the spirit of the example embodiments.

The concept of reducing signaling overhead by referencing is not limited to the probe request and probe response frames used in IEEE 802.11/Wi-Fi compliant communications systems. Generally speaking, a station may send an optimized management frame to an access point by referencing a received management frame (generally of the same type) that is sent from another station to the same access point or to a different access point. The access point may receive a first management frame from a first station and a second and optimized management frame from a second station, which incorporates the first management frame by referencing the first management frame. The access point may send a response management frame, at least to the second station, considering both the second management frame and the referenced first management frame to infer the complete management frame that the second station would have sent otherwise. Some examples of reference information that may be used to identify the referenced management frame include a sequence number, frame check sum (FCS), timestamp, dialog taken, source media access control (MAC) address, destination MAC address, receiver address, transmitter address, message transaction ID, and the like.

Similarly, an access point may send a regular management frame to a first station then send an optimized management frame (generally of the same type) to a second station with a reference to the earlier sent regular management frame. The second station may receive both the regular management frame, which is sent in response to the first station, and the optimized management frame, which includes the reference to the regular management frame, and is sent in response to the second station. The second station may consider both the regular management frame and the optimized management frame to infer the complete management frame that the access point would have sent otherwise.

The general concept can be further applied to any distributed wireless communication systems wherein a communication station listens to the media before transmitting data using the same media. Additional examples of such a distributed wireless communication system include IEEE 802.15, UWA, Bluetooth, and any device-to-device communication technologies. The example embodiments described herein can be particularly helpful when a large number stations try to access the access point at the same time. As the initial signaling in the access attempts tend to be the same or similar for all of the stations, a station may take advantage of the same information that has been sent by other stations to reduce its signaling overhead while not losing any information that it wishes to send, by referencing the same information sent by other stations. Similarly, the access point can reduce it signaling overhead while not losing any information that it wishes to send, by referencing the same information that it sent recently. By reducing the signaling overheads in these access attempts, the access network congestion is avoided and more stations may be able to finish their initial network access signaling procedures within the same time period. Thus, more stations may start to get services and the overall user experience may be improved.

Typically, when a station transmits a frame, such as a probe request frame or some other management frame, other stations operating within the general area may also receive and decode the frame. Similarly, when an access point transmits a frame, such as a probe response frame or some other management frame, to a station, other stations operating within the general area may also receive and decode the frame. Therefore, it may be possible to utilize information or information element(s) (IE) transmitted by other stations and/or access points to reduce communications system overhead.

Conventionally, each station, when discovering access points via active scanning, sends its own probe request frame without consideration of other probe request frames from other stations. This may lead to faster discovery of the access points compared to passive scanning, but the signaling overhead for sending these individual probe request frames may be too high for the communications system to operate efficiently. Moreover, the access point sends a probe response frame for each probe request frame without consideration of the other probe response frames that it has recently sent. However, many information elements in the probe request frames sent by different stations are the same and many information elements in the probe response frames sent by a single access point to different stations are the same. Repeatedly transmitting these common information elements among the probe request frames and/or probe response frames that are sent in temporal proximity may be an inefficient way of using available communications system resources, thereby leading to poor communications system efficiency.

Thus, according to an aspect of an example embodiment, the signaling overhead in performing active scanning may be reduced by sending an optimized management frame, such as an optimized probe request frame or an optimized probe response frame that incorporates, by reference, a recent probe request frame or a recent probe response frame.

According to an example embodiment, a station may transmit an optimized management frame, such as an optimized probe request frame, that includes a reference to a previously transmitted management frame, such as a probe request frame or a probe response frame, and update information that includes, among other things, information that the station would have included in its own management frame but is not included in the previously transmitted management frame. In other words, the update information includes the differences between the previously transmitted management frame and what the station would have included in its own management frame.

According to another example embodiment, an access point may receive a management frame, such as a first probe request, from a first station and an optimized management frame, such as an optimized probe request, from a second station. The optimized probe request may incorporate at least a portion of the first probe request by referencing the first probe request. The access point may transmit a management frame, such as a probe response, to at least the second station based on both the optimized probe request and the first probe request.

Figure 3A:
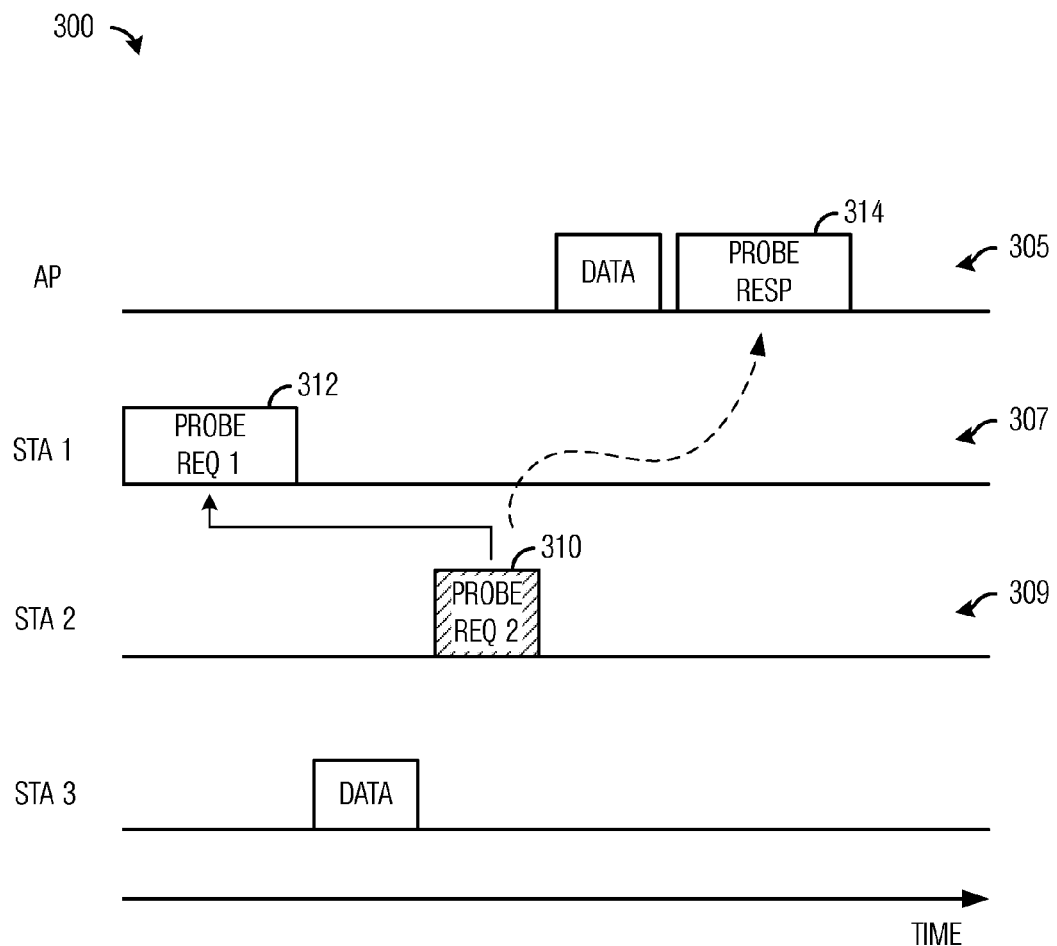
FIG. 3a illustrates an example first diagram of transmissions made in a communications system where optimized management frames are supported according to example embodiments described herein.

FIG. 3a illustrates a first diagram of transmissions 300 made in a communications system where optimized management frames are supported. As shown in FIG. 3a, a first trace 305 represents transmissions made by an access point ("AP"), a second trace 307 represents transmissions made by a first station ("STA 1"), and a third trace 309 represents transmissions made by a second station ("STA 2").

The second station may transmit an optimized management frame 310, e.g., an optimized probe request ("PROBE REQ 2"), which includes a reference to a first management frame 312, e.g., a probe request ("PROBE REQ 1"). In addition to the reference to first management frame 312, optimized management frame 310 may include update information of the difference between first management frame 312 and a second management frame that the second station would have transmitted in place of optimized management frame 310. The access point may transmit a third management frame 314, e.g., a probe response ("PROBE RESP"), to the second station. The access point may broadcast third management frame 314 to both the second station and a source of first management frame 312, i.e., a first station.

It is noted that the access point may unicast or broadcast third management frame 314 because the access point may have already transmitted a management frame responsive to first management frame 312 prior to receiving optimized management frame 310. This is especially true if optimized management frame includes update information that replaces, adds, or omits information element(s) in first management frame 312.

According to another example embodiment, the access point, in response to a first management frame received from a first station, may transmit a second management frame. Then, in response to a third management frame (whether optimized or not) received from a second station, transmit a first optimized management frame to at least the second station. The first optimized management frame including a reference to the second management frame and potentially update information. The access point may be able to do this as long as it knows that the second station (and possibly other stations) has been able to listen to the second management frame.

For a number of reasons, the access point may know that a target station of the first optimized management frame, i.e., the second station, has been able to listen to the second management frame. As an example, the access point may receive a second optimized management frame from the second station that includes a reference to the first management frame.

Figure 3B:
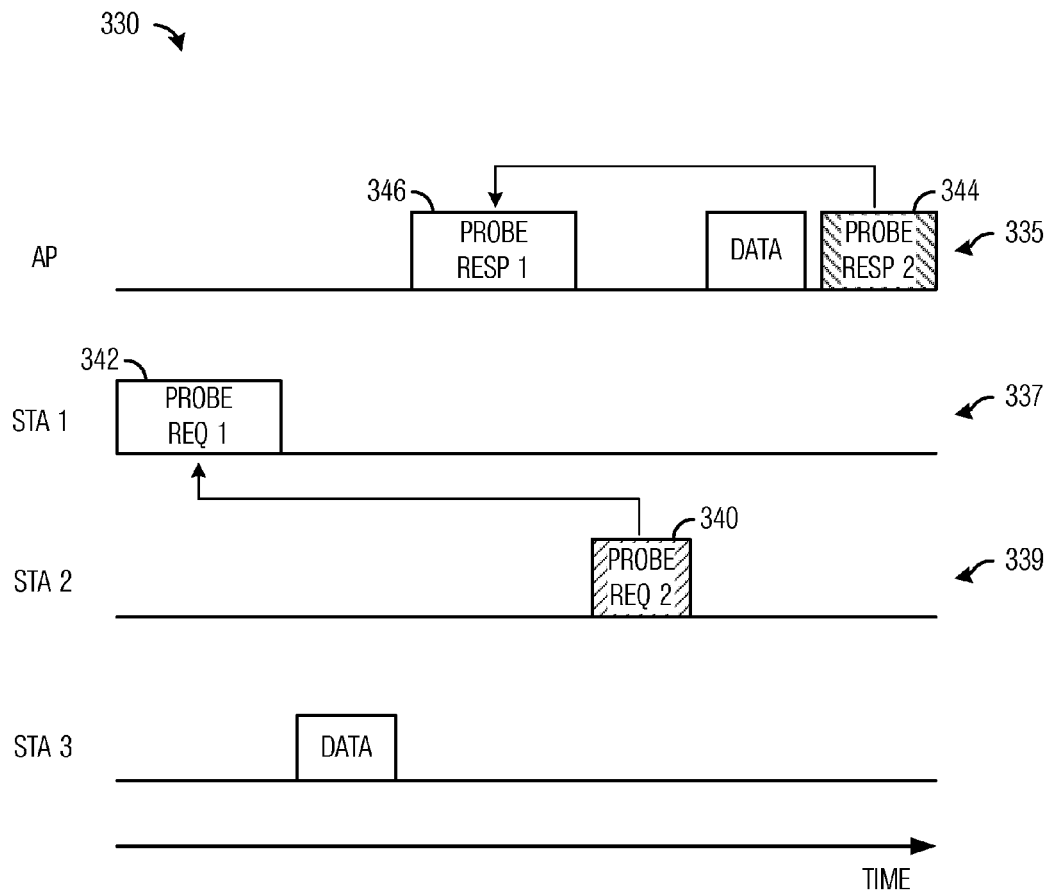
FIG. 3b illustrates an example second diagram of transmissions made in a communications system where optimized management frames are supported according to example embodiments described herein.

FIG. 3b illustrates a second diagram of transmissions 330 made in a communications system where optimized management frames are supported. As shown in FIG. 3b, a first trace 335 represents transmissions made by an access point ("AP"), a second trace 337 represents transmissions made by a first station ("STA 1"), and a third trace 339 represents transmissions made by a second station ("STA 2").

The second station may transmit a first optimized management frame 340, e.g., an optimized probe request ("PROBE REQ 2"), which includes a reference to a first management frame 342, e.g., a probe request ("PROBE REQ 1"). In addition to the reference to first management frame 342, first optimized management frame 340 may include update information of the difference between first management frame 342 and a second management frame that the second station would have transmitted in place of first optimized management frame 340. The access point may transmit a second optimized management frame 344, e.g., an optimized probe response ("PROBE RESP"), to the second station that includes a reference to a third management frame 346, e.g., a probe response ("PROBE RESP 1"). In addition to the reference to third management frame 346, second optimized management frame 344 may include update information of the difference between third management frame 346 and a fourth management frame that the access point would have transmitted in place of second optimized management frame 344.

As shown in FIG. 3b, the second station receives first management frame 342 sent by the first station to the access point. While waiting for the communications channel to clear, the second station processes first management frame 342 and to generate first optimized management frame 340 that references first management frame 342, thereby replacing its normal management frame with first optimized management frame 340. The second station transmits first optimized management frame 340 to the access point. Although the second station may have received third management frame 346 that the access point transmits in response to first management frame 342, it may not have had an opportunity to process third management frame 346 prior to transmitting first optimized management frame 340. Therefore, it may not have had an opportunity to cancel the transmission of first optimized management frame 340 or to modify first optimized management frame 340 with respect to third management frame 346. However, since first optimized management frame 340 references first management frame 342, the access point is able to infer that the second station has been awake and listening since the first management frame 342 is transmitted, thus must be awake and listening when the second optimized management frame 344 is transmitted. Therefore, the access point may transmit second optimized management frame 344 in response to first optimized management frame 340. Second optimized management frame 344 may supplement and/or replace information already provided in third management frame 346. The second station may receive and process both third management frame 346 and second optimized management frame 344 to discover the access point.

As another example, the access point may receive a first management frame, e.g., a first probe request from a first station, and a second management frame, e.g., a second probe request from a second station, before it is able to transmit a third management frame, e.g., a first probe response to the first management frame. In other words, the access point has too little time to process the second management frame in order to incorporate the information that is specific to the second station in the third management frame.

Figure 3C:
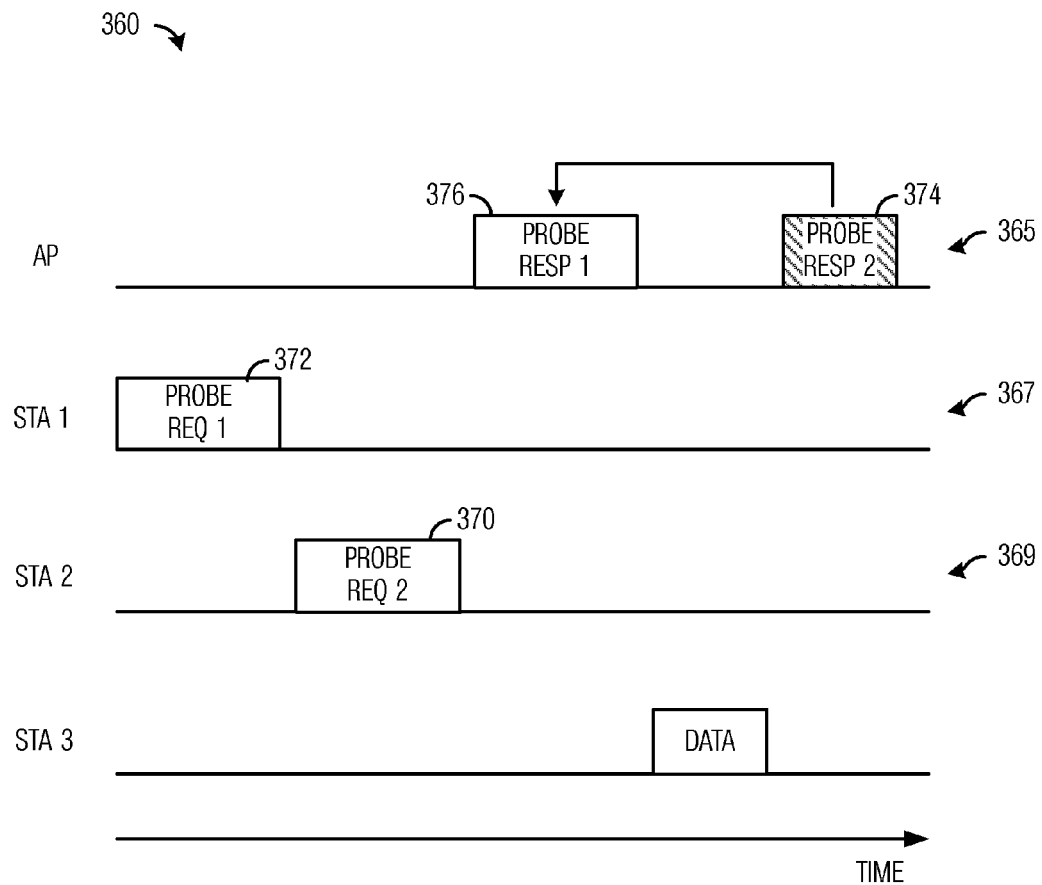
FIG. 3c illustrates an example third diagram of transmissions made in a communications system where optimized management frames are supported according to example embodiments described herein.

FIG. 3c illustrates a third diagram of transmissions 360 made in a communications system where optimized management frames are supported. As shown in FIG. 3c, a first trace 365 represents transmissions made by an access point ("AP"), a second trace 367 represents transmissions made by a first station ("STA 1"), and a third trace 369 represents transmissions made by a second station ("STA 2").

The second station may transmit a first management frame 370, e.g., a probe request ("PROBE REQ 2") after a second management frame 372 ("PROBE REQ 1") is transmitted by the first station. The access point may transmit an optimized management frame 374, e.g., an optimized probe response ("PROBE RESP 2"), to the second station that includes a reference to a third management frame 376, e.g., a probe response ("PROBE RESP 1"). In addition to the reference to third management frame 376, optimized management frame 374 may include update information of the difference between third management frame 376 and a fourth management frame that the access point would have transmitted in place of optimized management frame 374.

As shown in FIG. 3c, the second station transmits first management frame 370 after a first station transmits second management frame 372. First management frame 370 may or may not be an optimized management frame, depending on whether or not the second station was able to receive second management frame 372 and process second management frame 372 prior to generating and transmitting first management frame 370. The access point receives first management frame 370 before it transmits third management frame 376 in response to second management frame 372. Therefore, the access point is able to infer that the second station is listening and is able to receive third management frame 376. Hence, the access point may transmit optimized management frame 374 which references third management frame 376 in response to first management frame 370. The second station may receive and process both third management frame 376 and optimized management frame 374 to discover the access point.

Figure 3D:
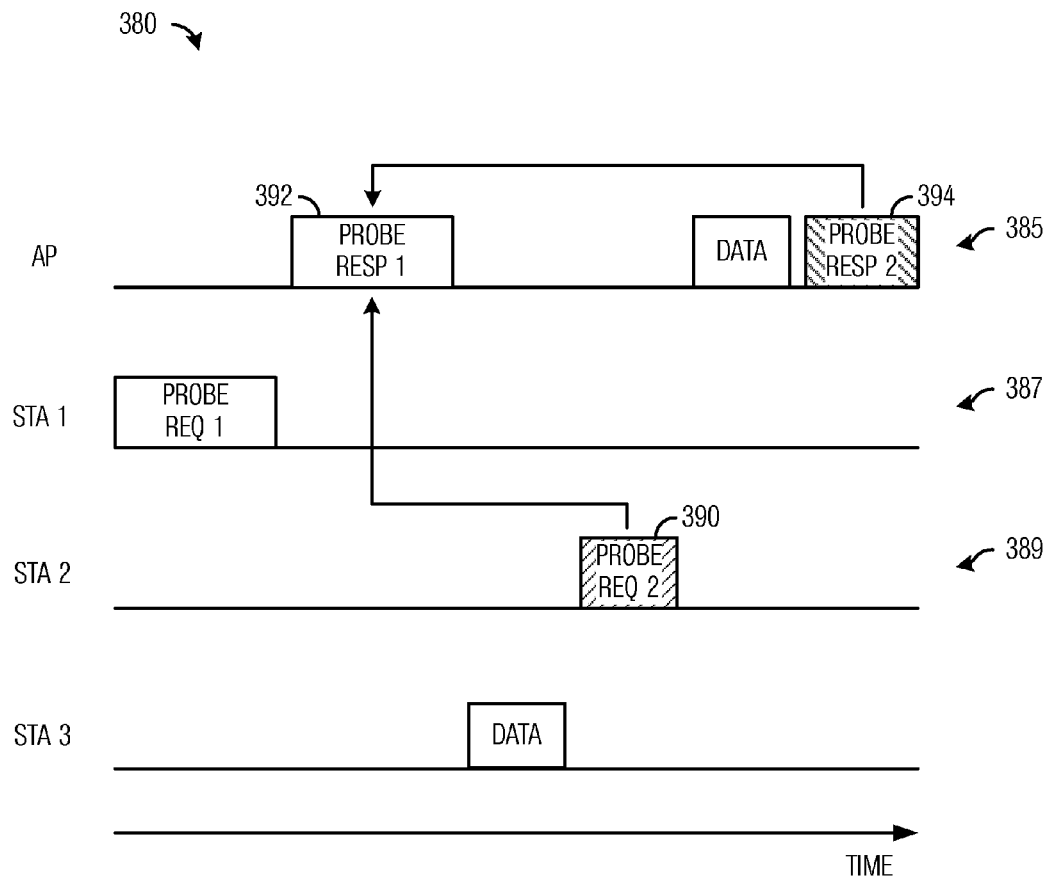
FIG. 3d illustrates an example fourth diagram of transmissions made in a communications system where optimized management frames are supported according to example embodiments described herein.

FIG. 3d illustrates a fourth diagram of transmissions 380 made in a communications system where optimized management frames are supported. As shown in FIG. 3d, a first trace 385 represents transmissions made by an access point ("AP"), a second trace 387 represents transmissions made by a first station ("STA 1"), and a third trace 389 represents transmissions made by a second station ("STA 2").

The second station may transmit a first optimized management frame 390, e.g., an optimized probe request ("PROBE REQ 2"), which includes a reference to a first management frame 392, e.g., a probe response ("PROBE RESP 1"). In addition to the reference to first management frame 392, first optimized management frame 390 may include update information of the difference between first management frame 392 and a second management frame that the second station would have transmitted in place of first optimized management frame 390. The access point may transmit a second optimized management frame 394, e.g., an optimized probe response ("PROBE RESP 2"), to the second station that may include a reference to first management frame 392. In addition to the reference to first management frame 392, second optimized management frame 394 may include update information of the difference between first management frame 392 and a third management frame that the access point would have transmitted in place of second optimized management frame 394.

The example embodiments discussed in reference to FIGS. 3a-3d reduce signaling overhead by referencing management frames transmitted by or to other stations served by a single access point. According to an example embodiment, in addition to referencing transmissions of management frames of other communications devices (including access points and stations) operating associated with a single access point, optimized management frames may reference transmissions of management frames transmitted by other access points.

Figure 4:
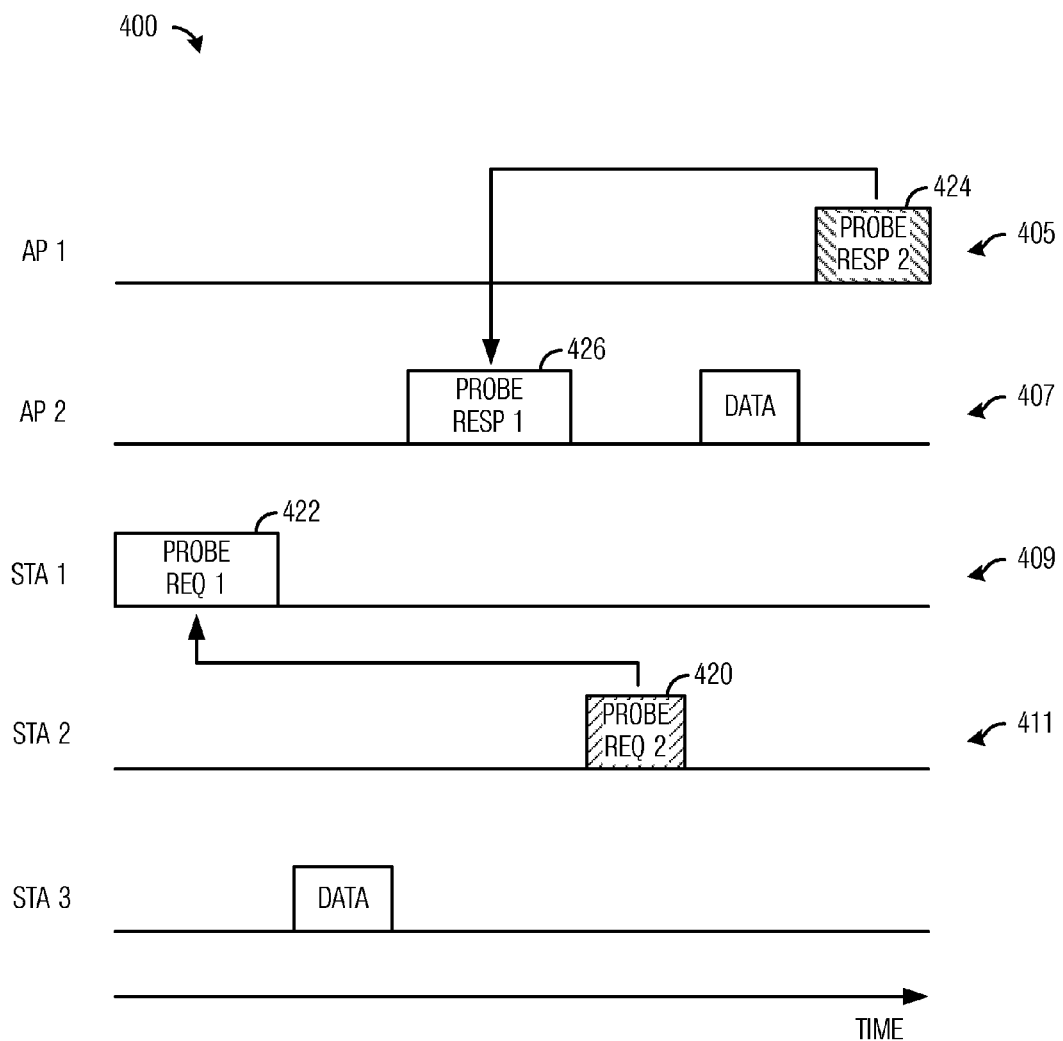
FIG. 4 illustrates an example diagram of transmissions made in a communications system where optimized management frames are supported and where the optimized frames may reference transmissions of management frames made by other access points according to example embodiments described herein.

FIG. 4 illustrates a diagram of transmissions 400 made in a communications system where optimized management frames are supported and where the optimized frames may reference transmissions of management frames made by other access points. As shown in FIG. 4, a first trace 405 represents transmissions made by a first access point ("AP 1"), a second trace 407 represents transmissions made by a second access point ("AP 2"), a third trace 409 represents transmissions made by a first station ("STA 1"), and a fourth trace 411 represents transmissions made by a second station ("STA 2").

The second station may transmit a first optimized management frame 420, e.g., an optimized probe request ("PROBE REQ 2"), which includes a reference to a first management frame 422, e.g., a probe request ("PROBE REQ 1"). In addition to the reference to first management frame 422, first optimized management frame 420 may include update information of the difference between first management frame 422 and a second management frame that the second station would have transmitted in place of first optimized management frame 420. The first access point may transmit a second optimized management frame 424, e.g., an optimized probe response ("PROBE RESP 2"), to the second station that includes a reference to a third management frame 426, e.g., a probe response ("PROBE RESP 1"). It is noted that third management frame 426 is transmitted by the second access point and not the first access point. In addition to the reference to first management frame 426, second optimized management frame 424 may include update information of the difference between second management frame 426 and a fourth management frame that the first access point would have transmitted in place of second optimized management frame 424. It is noted that that the situation presented herein (e.g., first optimized management frame 420 includes a reference to the first management frame 422) is for illustrative purposes, and that based on the same spirit illustrated in FIG. 3d, it is also possible that first optimized management frame 420 may include a reference to third management frame 426, e.g., a probe response ("PROBE RESP 1"), instead of first management frame 422.

As shown in FIG. 4, the first access point transmits second optimized management frame 424 referencing third management frame 426 that was transmitted by the second access point. In order to uniquely identify the management frames transmitted by different access points, the management frame reference information element in the optimized management frame sent by the first access point may include a transmitter address (TA), a basic service set identifier (BSSID), and the like, of the second access point of which a management frame is being referenced, in addition to a sequence control number, FCS, timestamp, and the like, of the management frame that is being referenced, as described previously. Alternatively, the FCS of a previously transmitted management frame may be sufficient since different TA or BSSID values typically generate different FCS. The referencing of management frames from different access points may be useful when both the first station and the second station are transmitting wildcard management frames. A wildcard management frame is typically a request frame (e.g. a probe request) that a station sends to an access point. Generally, a wildcard request means that any access point receiving such a request may answer it. In such a situation, the second access point may be able to take advantage of a management frame transmitted by another access point (e.g., a probe response) to reduce its signaling overhead.

According to an example embodiment, a station, before transmitting its management frame to an access point, may receive a management frame transmitted by another station. The station may intentionally apply a delay (e.g. a probe delay) to the transmission of its management frame and monitor the channel first in order to avoid the hidden node problem. In addition, a carrier sense multiple access with collision avoidance (CSMA/CD) technique and a random backoff mechanism used in IEEE 802.11 may also force the station to defer the transmission of its management frame (e.g., a probe request) due to the transmission of another station or losing the contention for the channel to another station. After receiving the other station's management frame, the station may compare information in the received management frame to information it is to request or supply in its own management frame. As an example, the comparing of the information may also include identifying what information elements are the same, what information elements are different, what information elements are lacking in the received management frame, what information elements in the received management frame are not needed, and the like. In accordance with the comparison of the information, the station may determine whether to use or not to use the received management frame as a reference. Similarly, if multiple management frames have been received, the station may perform the comparison with information from each received management frame and select one received management frame (if any meets a selection criteria) to use as a reference. The station may transmit to the access point an optimized management frame that incorporates at least a portion of the received management frame.

Figure 5A:
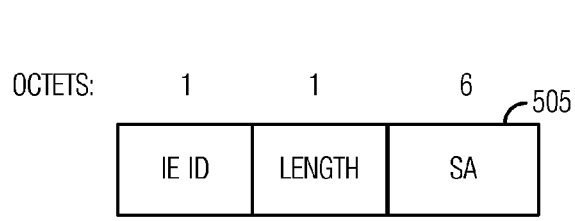
FIG. 5a illustrates a first example management frame reference information element according to example embodiments described herein.

As an illustrative example, the optimized management frame (e.g., an optimized probe request) may include a new management frame reference information element (IE), such as a new probe request reference information element, that contains reference information of the received management frame (which is also the referenced management frame), such as a source address (SA) of the received management frame (which may be the address of a station that transmitted the referenced management frame), a sequence control number, and/or a frame check sum (FCS) of the referenced management frame. FIG. 5a illustrates a first example management frame reference information element 500. As shown in FIG. 5a, an SA field 505 in the management frame reference information element 500 in the optimized management frame contains an SA used to indicate to a receiving access point, which also received the referenced management frame earlier, which management frame is being referenced.

Figure 5B:
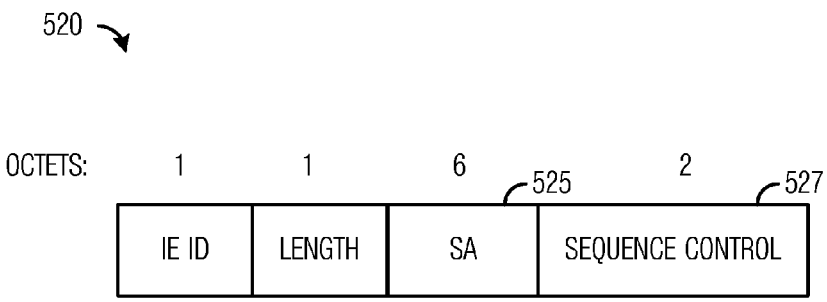
FIG. 5b illustrates a second example management frame reference information element according to example embodiments described herein.

FIG. 5b illustrates a second example management frame reference information element 520. As shown in FIG. 5b, an SA field 525 and a sequence control number 527 may be used together to uniquely identify a previously received management frame as a referenced management frame. The inclusion of the reference information to the previously received management frame, such as a probe request frame, the communications device, such as a station in this example, may not need to transmit common information in the optimized management frame, thereby reducing signaling overhead. As an example, a probe request frame may contain more than 100 bytes of information. However, an optimized probe request frame, such as one that only includes a management frame reference information element as shown in FIGS. 5a and 5b, may contain a frame body, which excludes the MAC header, on the order of 10 bytes, with management frame reference information element 500 being only 8 bytes long.

If there is any to-be-requested information missing or any to-be-replaced information in the referenced management frame, such as a probe request, the communications device, such as a station in this example, may also include the missing information element or the to-be-replaced information element in the optimized management frame. An explicit placement of such an information element in the optimized management frame by a first communications device may indicate to a second communications device, such as an access point in the case of an optimized probe request, that the second communications device may consider the optimized management frame from the first communications device as the referenced management frame with supplements and/or replacement information as contained in the information elements explicitly carried in the optimized management frame. Since the information elements in a management frame should be carried in a pre-defined order, an information element that is explicitly carried in the optimized management frame, for the aforementioned reasons, may be carried before or after the new management frame reference information element. The ordering should not negate the fact that an explicitly carried information element should take precedence over the same information element that happens to be carried in the referenced management frame. It is noted that the information elements carrying the missing information elements and/or the to-be-replaced information elements may be referred to as update information.

Figure 5C:
FIG. 5c illustrates a third example management frame reference information element with a sequence control field that includes a sequence control number according to example embodiments described herein.
Figure 5D:
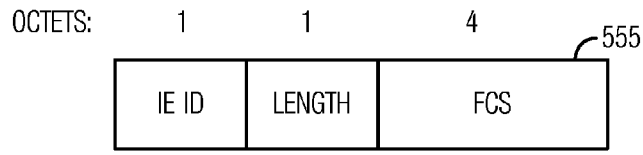
FIG. 5d illustrates a fourth example management frame reference information element with a FCS field that includes a FCS according to example embodiments described herein.
Figure 5E:
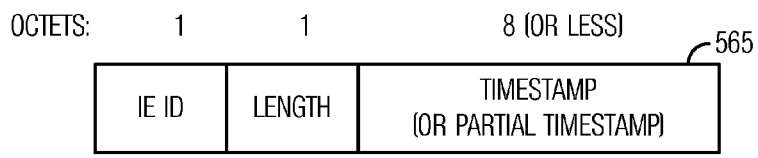
FIG. 5e illustrates a fifth example management frame reference information element with a timestamp field that includes a timestamp or a partial timestamp, such as a number of least significant bits (LSB) or bytes of a timestamp according to example embodiments described herein.

According to an example embodiment, the optimized management frame may include a new management frame reference information element, such as a new probe response reference information element, that contains reference information of a previously transmitted management frame, such as a sequence control number, a FCS, a timestamp, and the like, which is used to infer which management frame is being referenced. FIG. 5c illustrates a third example management frame reference information element 540 with a sequence control field 545 that includes a sequence control number that is used to infer which management frame is being referenced. FIG. 5d illustrates a fourth example management frame reference information element 550 with a FCS field 555 that includes a FCS copied from the referenced management frame. FIG. 5e illustrates a fifth example management frame reference information element 560 with a timestamp field 565 that includes a timestamp or a partial timestamp copied from the referenced management frame, such as a number of least significant bits (LSB) or bytes of the TimeStamp field defined in the current 802.11 standard. A station receiving the optimized management frame may use the reference information to uniquely identify a previously received management frame and apply any included update information to discover the access point. Therefore, by providing reference information for a previously transmitted management frame, the access point does not need to repeat the transmission of information common to both management frames. As an example, a regular probe response may be longer than 100 bytes, while an optimized management frame, such as one that only includes a management frame reference information element as shown in FIGS. 5c-5e, may have a frame body, which excludes the MAC header, as short as 4 bytes in length.

Figure 5F:
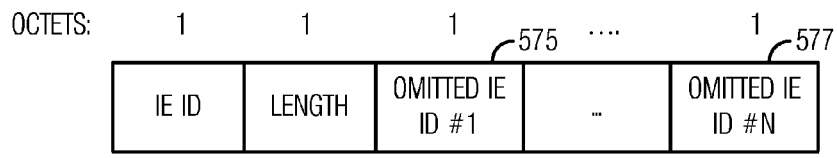
FIG. 5f illustrates an example request information omission information element according to example embodiments described herein.

If the referenced management frame includes information that is not needed by the communications device, the communications device may include in the optimized management frame a request information omission information element to indicate identifiers of the information elements in the referenced management frame that are not needed by the communications device. Thus, the second communications device may consider the optimized management frame from the first communications device as the referenced management frame with information element(s) specified in the request information omission information element removed. FIG. 5f illustrates an example request information omission information element 570. As shown in FIG. 5f, a first field 575 includes an identifier of a first omitted information element, and a second field 577 includes an identifier of an N-th omitted information element. Therefore, the request information omission information element and explicitly carried regular information elements may be used to highlight communications device-specific information in each management frame, while the repetition of common information is avoided in the optimized management frame.

If there is any to-be-supplied information missing or any to-be-replaced information in the referenced management frame, such as a probe response, the communications device, such as an access point in this example, may also include the missing information element or the to-be-replaced information element in the optimized management frame. An explicit placement of such an information element in the optimized management frame by a first communications device may indicate to a second communications device, such as a station in the case of an optimized probe response, that the second communications device may consider the optimized management frame from the first communications device as the referenced management frame with supplements and/or replacement information as contained in the information elements explicitly carried in the optimized management frame. Since the information elements in a management frame should be carried in a pre-defined order, an information element that is explicitly carried in the optimized management frame, for the aforementioned reasons, may be carried before or after the new management frame reference information element. The ordering should not negate the fact that an explicitly carried information element should take precedence over the same information element that happens to be carried in the referenced management frame. It is noted that the information elements carrying the missing information elements and/or the to-be-replaced information elements may be referred to as update information.

In some situations, a second station may be able to receive frames from an access point but it may not be able to receive frames from a first station, e.g., the first station may be located at a far end of a coverage area of the access point. Therefore, the second station may not be able to receive a first management frame transmitted by the first station but it may be able to receive a second management frame transmitted by the access point in response to the first management frame. In such a situation, the second management frame may not fully address the requirements of the second station. According to another example embodiment, the second station may transmit an optimized management frame, e.g., an optimized probe request, which references a received management frame transmitted by the access point, e.g., a probe response, which may be transmitted earlier in response to another station's probe request. As an example, referencing FIGS. 5c-5f, a management frame reference information element may be included in the optimized management frame. The second station may also include information elements that are missing or are to-be-replaced in the referenced management frame. The incorporation of the referenced management frame may include to the access point that the second station already has access to information included in a management frame previously transmitted by the access point. Hence, the access point may only need to provide any additional or unique information to the second station by transmitting an optimized management frame that references a previously transmitted management frame (an example of which is shown in FIG. 3d).

Figure 6A:
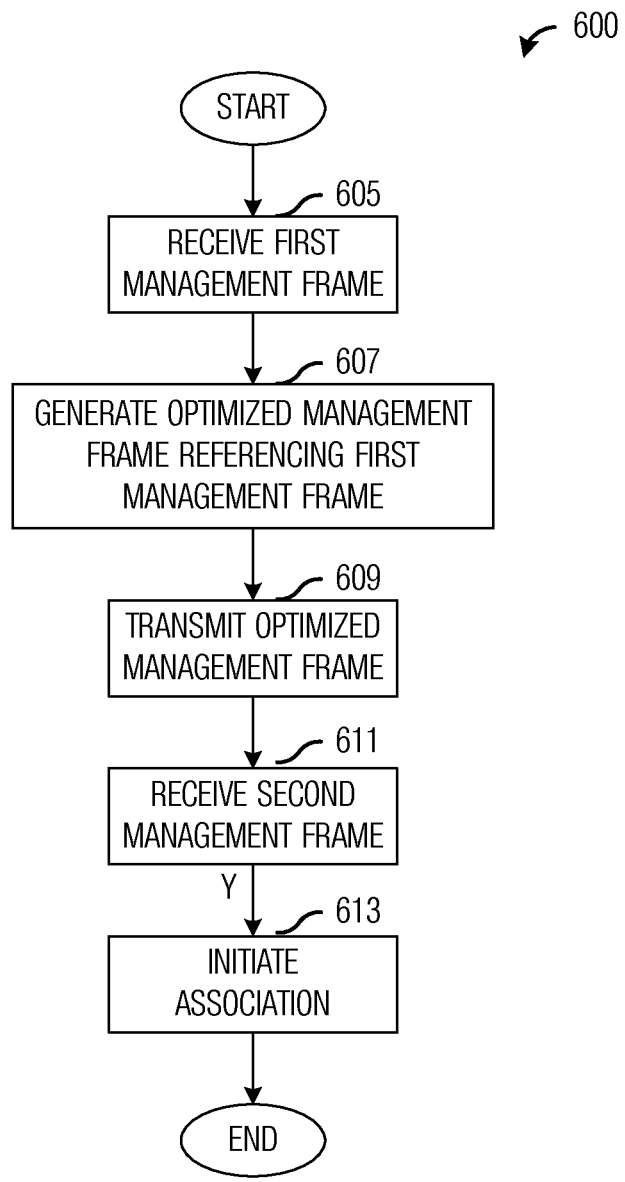
FIG. 6a illustrates a first example flow diagram of operations occurring in a station as the station discovers an access point according to example embodiment described herein.

FIG. 6a illustrates a flow diagram of operations 600 occurring in a station as the station discovers an access point. Operations 600 may be indicative of operations occurring in a station, such as station 110-134, as the station discovers an access point.

Operations 600 may begin with the station receiving a first management frame (block 605). The first management frame may be a probe request transmitted by another station. Alternatively, the first management frame may be a probe response transmitted by an access point. However, the first management frame may be one of any other type of management frame as discussed previously. The station may generate an optimized management frame with a reference to the first management frame (block 607). The optimized management frame may also include update information which may replace, adds, and/or omits information elements in the first management frame so that the optimized management frame includes information elements required by the station. In other words, the update information may be used to modify information elements in the first management frame in such a way that the optimized management frame will have information elements as required by the station. The optimized management frame may be an optimized probe request. However, the optimized management frame may be one of any other type of management frame as discussed previously.

The station may transmit the optimized management frame to an access point (block 609). The station may receive a second management frame from the access point (block 611). The second management frame may be a probe response transmitted by the access point in response to the optimized management frame. However, the second management frame may be one of any other type of management frame as discussed previously. The station may obtain information about the access point from the second management frame and the station may initiate an association with the access point (block 613). It is noted that the station may also obtain information about the access point from the received first management frame if the first management frame is the same type of frame as the second management frame. It is noted that in some configurations, the station may tune to a different frequency channel and repeat its scanning for access points that are operating in the different frequency channel. In such a configuration, the station may scan some or all of the available frequency channels prior to selecting an access point and initiating an association with the selected access point.

Figure 6B:
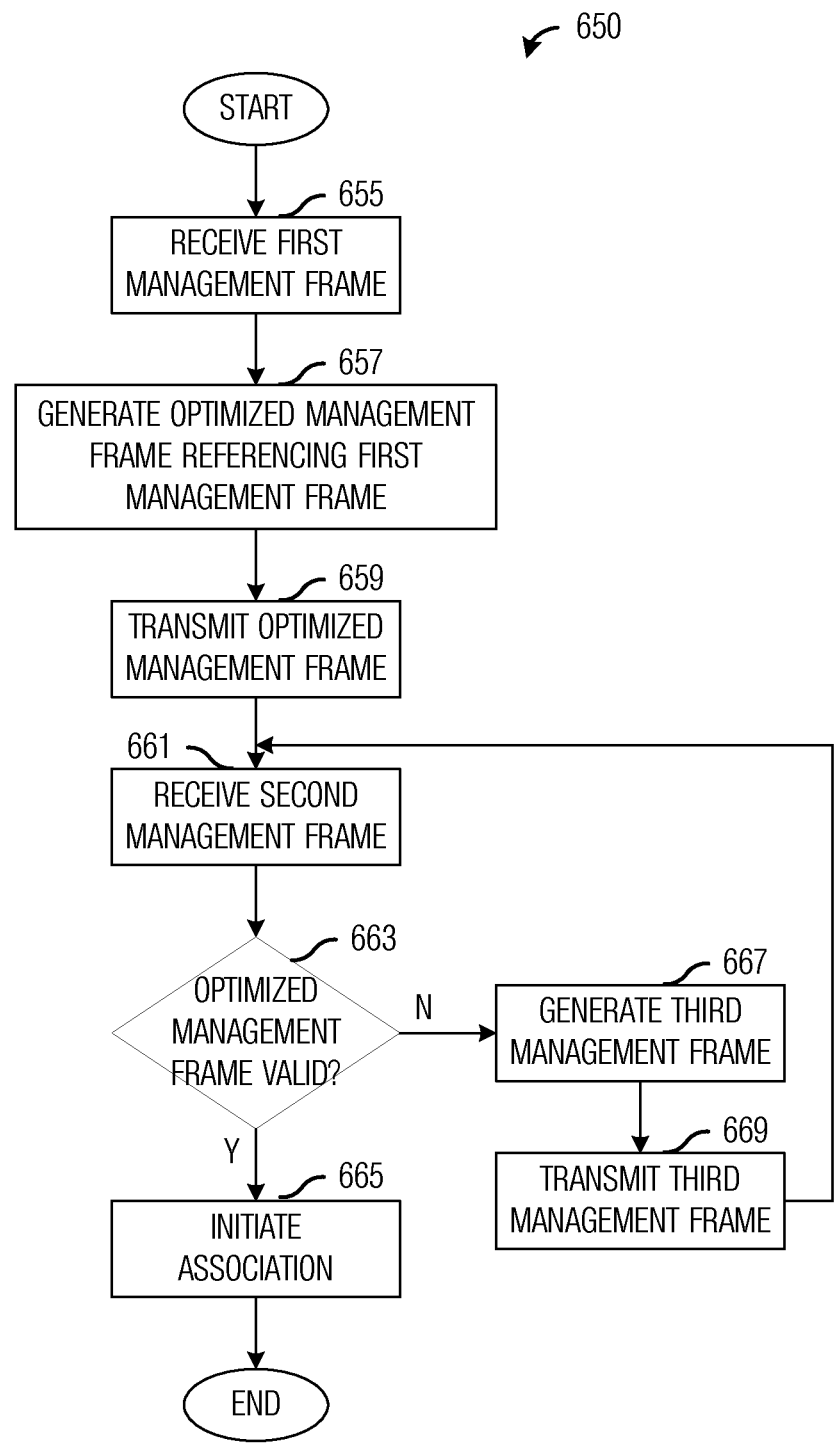
FIG. 6b illustrates a second example flow diagram of operations occurring in a station as the station discovers an access point according to example embodiments described herein.

FIG. 6b illustrates a flow diagram of operations 650 occurring in a station as the station discovers an access point. Operations 650 may be indicative of operations occurring in a station, such as stations 110-134, as the station discovers an access point.

Operations 650 may begin with the station receiving a first management frame (block 655). The first management frame may be a probe request transmitted by another station. Alternatively, the first management frame may be a probe response transmitted by an access point. However, the first management frame may be one of any other type of management frame as discussed previously. The station may generate an optimized management frame with a reference to the first management frame (block 657). The optimized management frame may also include update information which may replace, adds, and/or omits information elements in the first management frame so that the optimized management frame includes information elements required by the station. The optimized management frame may be an optimized probe request. However, the optimized management frame may be one of any other type of management frame as discussed previously.

The station may transmit the optimized management frame to an access point (block 659). The station may receive a second management frame from the access point (block 661). The second management frame may be a probe response transmitted by the access point in response to the optimized management frame. However, the second management frame may be one of any other type of management frame as discussed previously.

A robust communications system generally should be able to recover from error events. As an illustrative example, when an access point does not receive the first management frame but receives the optimized management frame that refers to the first management frame, the access point may not be able to locate the first management frame and therefore may not be able to construct the information requested by the station. In order to inform the station that the access point was not able to locate the first management frame, the access point may transmit a negative management frame, e.g., a negative probe response, to both the station and a source station of the first management frame. The negative management frame may indicate an invalid reference of a probe request, for example.

As an example, the access point may include in the negative management frame, an invalid management frame reference information element, e.g., an invalid probe request reference information element. The invalid management frame reference information element may have a similar information element structure as the management frame reference information element but with a different information element identifier (information element ID) to indicate the different meaning. With the invalid probe response reference information element, the access point may copy the SA and/or sequence control number from the probe request reference information element of the optimized management frame, which is used by both stations to uniquely identify the probe request that the access point has not received. When the source station of the first management frame receives the negative management frame, it may interpret that the access point did not receive the first management frame. The source station may attempt to retransmit the first management frame or it may determine that it is outside of the coverage area of the access point and therefore the access point may not be suitable as its serving access point, thereby terminating the scanning of the access point.

The station may perform a check to determine if the received second management frame indicates that the optimized management frame that it transmitted is a valid optimized management frame (block 663). In general, an optimized management frame is valid if it references a management frame that has also been received by the recipient of the optimized management frame. According to an example embodiment, if the optimized management frame is not valid, the access point may include an indicator in the second management frame to indicate to the station that the optimized management frame is not valid.

If the optimized management frame is valid (block 663), the station may obtain information about the access point from the second management frame and the station may initiate an association with the access point (block 665). It is noted that in some configurations, the station may tune to a different frequency channel and repeat its scanning for access points that are operating in the different frequency channel. In such a configuration, the station may scan some or all of the available frequency channels prior to selecting an access point and initiating an association with the selected access point.

If the optimized management frame is not valid (block 663), the station may generate a third management frame (block 667). Depending on configuration, the third management frame may be an optimized management frame that includes a reference to a management frame that is different from the referenced management frame of the optimized management frame. Potentially, the source station of the two referenced management frames may be the same. Alternatively, the third management frame may be a regular management frame, e.g., a probe request, including information needed by the station. The third management frame may also include an invalid management frame reference information element, e.g., an invalid probe response reference information element, which is similar to the management frame reference information element, e.g., a probe response reference information element. The invalid management frame reference information element may include a sequence control number in the referenced but invalid optimized management frame to indicate to the access point the reason that the station is transmitting another management frame, e.g., the access point does not have a valid record of the first management frame. The station may transmit the third management frame (block 669) and return to block 661 to receive a management frame that corresponds to the third management frame. Upon receipt of the third management frame, the access point may transmit a regular management frame, e.g., probe response, to the station.

In order to avoid or minimize errors as described previously, it may be useful for a transmitting device of an optimized management frame to know that a receiving device of the optimized management frame is supposed to have a record of the management frame referenced by the optimized management frame. This restriction may impose some memory requirements on stations and access points. In order to limit such memory requirements, a timer, such as a maximal timer, may be specified for access points and stations to memorize management frames received or transmitted in the past. As an example, in IEEE 802.11 Task Group ai (TGai), a goal is for stations to complete an initial like setup with an access point within 100 milliseconds. Therefore, a meaningful value for the timer may be on the order of tens of milliseconds at the most. Hence, the memory requirement is generally not excessive. According to an example embodiment, a timer for each management frame is initialized with a specified value (e.g., the maximal timer value) and is started with the management frame is transmitted or received. After the timer expires, the access point and/or station may assume that the other no longer has a valid record of receipt or transmission of the associated management frame. Any subsequent optimized management frame that references a management frame with an expired timer may be determined to be an invalid management frame. Additionally, a transmitting device of an optimized management frame should not reference a management frame with an expired timer.

Figure 7A:
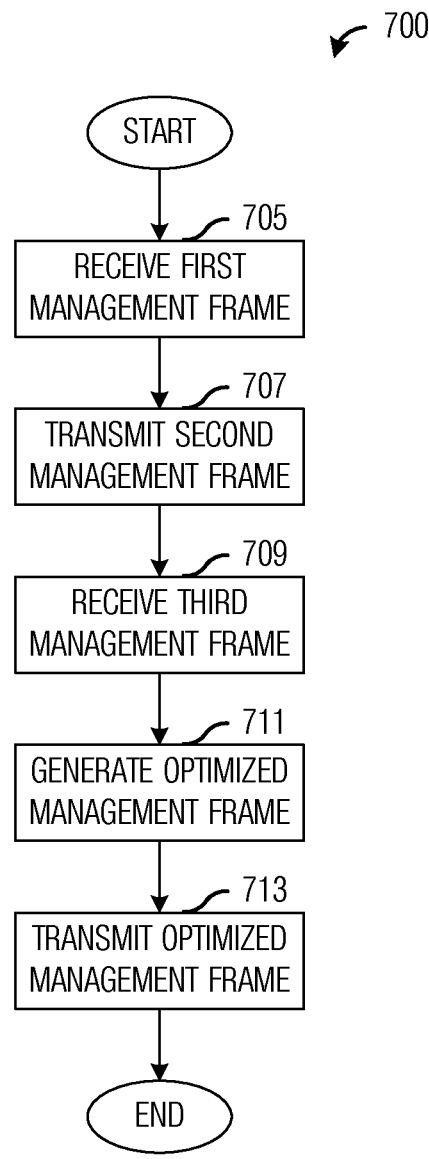
FIG. 7a illustrates an example flow diagram of first operations occurring in an access point as the access point participates in a discovery process according to example embodiments described herein.

FIG. 7a illustrates a flow diagram of first operations 700 occurring in an access point as the access point participates in a discovery process. First operations 700 may be indicative of operations occurring in an access point, such as access point 105, participates in a discovery process with a plurality of stations.

First operations 700 may begin with the access point receiving a first management frame, e.g., a probe request, from a first station (block 705). The access point may respond to the first management frame with a second management frame, e.g., a probe response (block 707). The access point may receive a third management frame, e.g., a probe request, for a second station (block 709). As discussed previously, due to the order in which the first management frame, the second management frame, and the third management frames were received and/or transmitted, the access point may be able to infer that the second station was able to receive the second management frame. Alternatively, as described previously and illustrated in FIG. 3*d*, the access point may receive the third management frame from the second station that explicitly references the second management frame, e.g., by providing a reference information of a sequence number that was in the second management frame. As a result, the access point generates an optimized management frame in response to the third management frame (block 711). The optimized management frame may also include update information to replace, add, or omit information in the second management frame. The access point may transmit the optimized management frame (block 713).

Figure 7B:
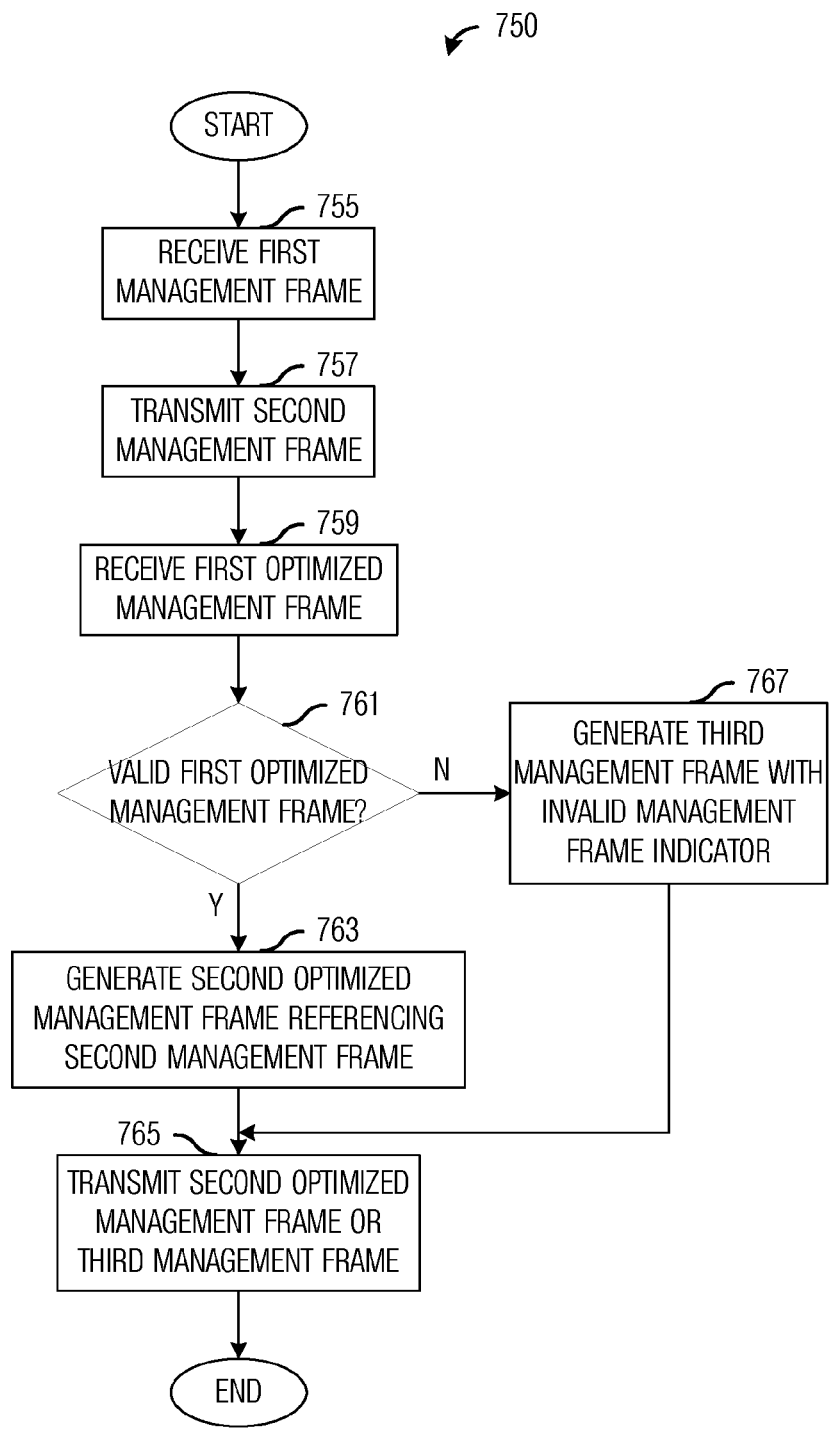
FIG. 7b illustrates an example flow diagram of second operations occurring in an access point as the access point participates in a discovery process according to example embodiments described herein.

FIG. 7*b* illustrates a flow diagram of second operations 750 occurring in an access point as the access point participates in a discovery process. Second operations 750 may be indicative of operations occurring in an access point, such as access point 105, participates in a discovery process with a plurality of stations.

Second operations 750 may begin with the access point receiving a first management frame, e.g., a probe request, from a first station (block 755). The access point may respond to the first management frame with a second management frame, e.g., a probe response (block 757). The access point may receive a first optimized management frame, e.g., an optimized probe request, from a second station (block 759). The first optimized management frame may include a reference to the first management frame. The first optimized management frame may also include update information to replace, add, or omit information in the first management frame.

The access point may perform a check to determine if the first optimized management frame is valid (block 761). In general, an optimized management frame is valid if it references a management frame that has been received by the access point. If the first optimized management frame is valid, the access point may generate a second optimized management frame, e.g., an optimized probe response (block 763). The second optimized management frame may include a reference to the second management frame. The second optimized management frame may also include update information to replace, add, or omit information in the second management frame. The access point may transmit the second optimized management frame to the second station (block 765).

If the first optimized management frame is not valid, the access point may generate a third management frame, e.g., a negative management frame (block 767). The third management frame may include an invalid management frame indicator that indicates that the referenced management frame of the first optimized management frame, i.e., the first management frame, has not been received by the access point. The access point may transmit the third management frame to at least the second station (and potentially the first station) (block 765).

According to an example embodiment, a third station, may, in a first optimized management frame, further incorporate by referencing a second optimized management frame transmitted by a second station and/or an access point. Similarly, a first access point, may, in a first optimized management frame, further incorporate by referencing a second optimized management frame transmitted by a second access point and/or a station. Since multiple levels of referencing may incur significant memory requirements, its use may be permitted in certain circumstances but not in others.

According to an example embodiment, in order to permit other stations to overhear (receive) a management frame transmitted by a station to an access point or by the access point to the station, the management frame may be transmitted by using a broadcast address as a receiver address (RA) of the management frame.

Figure 8:
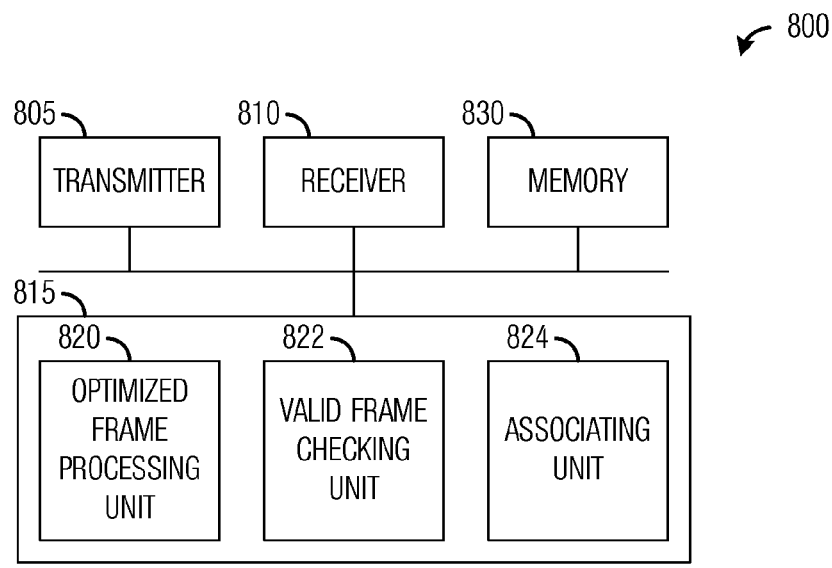
FIG. 8 illustrates an example first communications device according to example embodiments described herein.

FIG. 8 illustrates a first communications device 800. Communications device 800 may be an implementation of a station, such as mobile station, a mobile, a user, a terminal, a subscriber, a user equipment, and the like. Communications device 800 may be used to implement various ones of the embodiments discussed herein. As shown in FIG. 8, a transmitter 805 is configured to transmit management frames, such as probe request frames, and the like. Communications device 800 also includes a receiver 810 that is configured to receive management frames, such as probe response frames, and the like.

An optimized frame processing unit 820 is configured to generate optimized management frames. Optimized frame processing unit 820 is configured to select management frames to reference, as well as maintain records of valid and/or invalid management frames, such as by using timers. Optimized frame processing unit 820 is configured to generate update information to replace, add, or omit information in referenced management frames. Optimized frame processing unit 820 is configured to generate a full management frame from the referenced management frame and the update information. A valid frame checking unit 822 is configured to determine validity of an optimized management frame. Valid frame checking unit 822 is configured to use records of valid and/or invalid management frames to determine validity of the optimized management frame. An associating unit 824 is configured to initiate and perform steps in associating with an access point. A memory 830 is configured to store management frames, optimized management frames, update information, valid and/or invalid management frame records, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while optimized frame processing unit 820, valid frame checking unit 822, and associating unit 824 may be software modules executing in a microprocessor (such as processor 815) or a custom circuit or a custom compiled logic array of a field programmable logic array. Optimized frame processing unit 820, valid frame checking unit 822, and associating unit 824 may be modules stored in memory 830.

Figure 9:
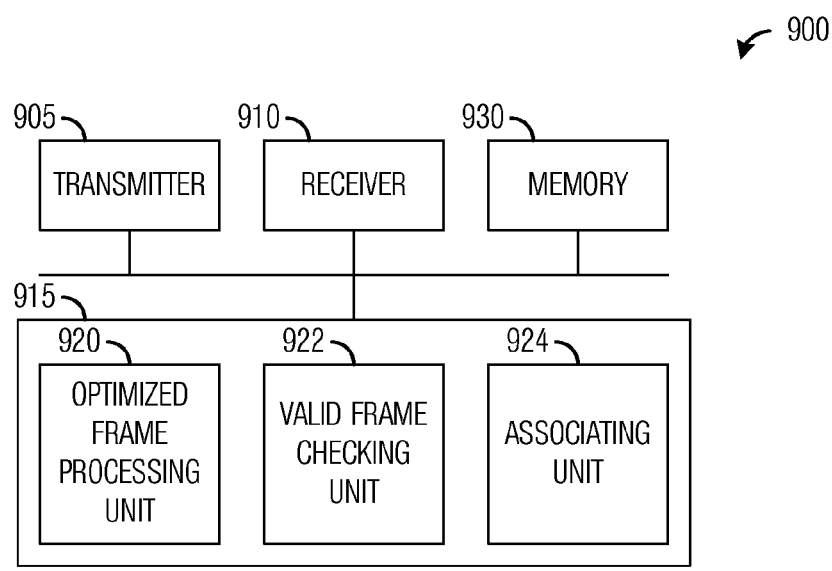
FIG. 9 illustrates an example second communications device according to example embodiments described herein.

FIG. 9 illustrates a second communications device 900. Communications device 900 may be an implementation of an access point, a communications controller, a base station, and the like. Communications device 900 may be used to implement various ones of the embodiments discussed herein. As shown in FIG. 9, a transmitter 905 is configured to transmit management frames, such as probe response frames, and the like. Communications device 900 also includes a receiver 910 that is configured to receive management frames, such as probe request frames, and the like.

An optimized frame processing unit 920 is configured to generate optimized management frames. Optimized frame processing unit 920 is configured to select management frames to reference, as well as maintain records of valid and/or invalid management frames, such as by using timers. Optimized frame processing unit 920 is configured to generate update information to replace, add, or omit information in referenced management frames. Optimized frame processing unit 920 is configured to generate a full management frame from the referenced management frame and the update information. A valid frame checking unit 922 is configured to determine validity of an optimized management frame. Valid frame checking unit 922 is configured to use records of valid and/or invalid management frames to determine validity of the optimized management frame. An associating unit 924 is configured to initiate and perform steps in associating with an access point. A memory 930 is configured to store management frames, optimized management frames, update information, valid and/or invalid management frame records, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while optimized frame processing unit 920, valid frame checking unit 922, and associating unit 924 may be software modules executing in a microprocessor (such as processor 915) or a custom circuit or a custom compiled logic array of a field programmable logic array. Optimized frame processing unit 920, valid frame checking unit 922, and associating unit 924 may be modules stored in memory 930.

Although the present disclosure and its advantages have been described in detail, it should be understood that various changes, substitutions and alterations can be made herein without departing from the spirit and scope of the disclosure as defined by the appended claims.

What is claimed is:

1. A method comprising:
    receiving, by a station from an access point, a first probe response frame, the first probe response frame comprising a first sequence number and comprising first information elements, and one or more of the first information elements indicating a capability of the access point;
    transmitting, by the station to the access point, a probe request frame comprising the first sequence number; and
    receiving, by the station from the access point, a second probe response frame responsive to the probe request frame, the second probe response frame comprising a second sequence number and comprising second information elements to be updated at the station, and the second information elements comprising a portion of the first information elements.

2. The method of claim 1, further comprising updating, by the station, information about the access point by processing the second information elements.

3. The method of claim 2, further comprising determining, by the station, to initiate an association procedure with the access point in accordance with the updated information about the access point.

4. The method of claim 2, further comprising initiating, by the station, an association procedure with the access point in accordance with the updated information about the access point.

5. A method comprising:
    transmitting, by an access point to a station, a first probe response frame, the first probe response frame comprising a first sequence number and comprising first information elements, and one or more of the first information elements indicating a capability of the access point;
    receiving, by the access point from the station, a probe request frame comprising the first sequence number; and
    transmitting, by the access point to the station, a second probe response frame, the second probe response frame comprising a second sequence number and comprising second information elements, and the second information elements comprising a portion of the first information elements.

6. The method of claim 5, further comprising participating, by the access point, in an association procedure with the station after transmitting the second probe response frame.

7. A station comprising:
    a receiver;
    a transmitter;
    a non-transitory memory storage comprising instructions; and
    a processor in communication with the transmitter, receiver and the memory storage, wherein the processor executes the instructions to:
        receive, from an access point, a first probe response frame, wherein the first probe response frame comprises a first sequence number and comprises first information elements, and wherein one or more of the first information elements indicates a capability of the access point;
        transmit, to the access point, a probe request frame comprising the first sequence number; and
        receive, from the access point, a second probe response frame responsive to the probe request frame, wherein the second probe response frame comprises a second sequence number and comprises second information elements to be updated at the station, and wherein the second information elements comprise a portion of the first information elements.

8. The station of claim 7, wherein the processor executes the instructions to update information about the access point by processing the second information elements.

9. The station of claim 8, wherein the processor executes the instructions to determine to initiate an association procedure with the access point in accordance with the updated information about the access point in the memory storage.

10. The station of claim 8, wherein the processor executes the instructions to initiate an association procedure with the access point in accordance with the updated information about the access point.

11. An access point comprising:
    a receiver;
    a transmitter;
    a non-transitory memory storage comprising instructions; and
    a processor in communication with the transmitter, receiver and the memory storage, wherein the processor executes the instructions to:
        transmit, to a station, a first probe response frame, wherein the first probe response frame comprises a first sequence number and comprises first information elements, and wherein one or more of the first information elements indicates a capability of the access point;

receive, from the station, a probe request frame comprising the first sequence number; and transmit, to the station, a second probe response frame, wherein the second probe response frame comprises a second sequence number and comprises second information elements, and wherein the second information elements comprise a portion of the first information elements.

12. The access point of claim 11, wherein the processor executes the instructions to participate in an association procedure with the station after transmitting the second probe response frame.

\* \* \* \* \*